(12) United States Patent
Cortina et al.

(10) Patent No.: US 7,592,557 B2
(45) Date of Patent: Sep. 22, 2009

(54) HORN ACTUATOR SWITCH

(75) Inventors: Roger M. Cortina, Amherstburg (CA); Steven L. Stram, Trenton, MI (US)

(73) Assignee: Chrysler Group LLC, Auburn Hills, MI (US)

( * ) Notice: Subject to any disclaimer, the term of this patent is extended or adjusted under 35 U.S.C. 154(b) by 319 days.

(21) Appl. No.: 11/747,952

(22) Filed: May 14, 2007

(65) Prior Publication Data
US 2008/0282959 A1   Nov. 20, 2008

(51) Int. Cl.
*H01H 9/00*   (2006.01)
(52) U.S. Cl. .................................. 200/61.54; 280/731
(58) Field of Classification Search ... 200/61.54–61.57; 280/728.2, 731
See application file for complete search history.

(56) References Cited

U.S. PATENT DOCUMENTS

| | | | |
|---|---|---|---|
| 4,004,114 A | 1/1977 | Baduel | |
| 4,785,144 A | 11/1988 | Fosnaugh et al. | |
| 4,789,763 A | 12/1988 | Nagata et al. | |
| 4,808,776 A | 2/1989 | Niwa et al. | |
| 5,410,114 A * | 4/1995 | Furuie et al. | 200/61.55 |
| 6,600,114 B2 * | 7/2003 | Kikuta et al. | 200/61.55 |
| 7,322,602 B2 * | 1/2008 | Tsujimoto et al. | 280/731 |
| 7,377,543 B2 * | 5/2008 | Vazquez et al. | 280/731 |
| 7,490,852 B2 * | 2/2009 | Marotzke et al. | 280/731 |
| 7,533,897 B1 * | 5/2009 | Xu et al. | 280/728.2 |

* cited by examiner

*Primary Examiner*—Michael A Friedhofer
(74) *Attorney, Agent, or Firm*—Ralph E. Smith

(57) ABSTRACT

A horn actuator for a vehicle horn mounts to a steering wheel hub. The horn actuator has a number of support posts that each pass through a switch cup and mount into the steering wheel hub. A switch lies within the switch cup and a spring biases the switch cup away from the steering wheel hub. An air bag plate presses against the switch cup and biases the spring to cause the switch to make contact when a force is applied to the air bag. When activated, the switch relays electricity to a vehicle horn. The support posts are connected to each other by a connector portion that provides rigidity to the structure and provides a surface for wiring of the electrical switches. Additional support posts, cups and switches are connected by additional connector portions.

20 Claims, 7 Drawing Sheets

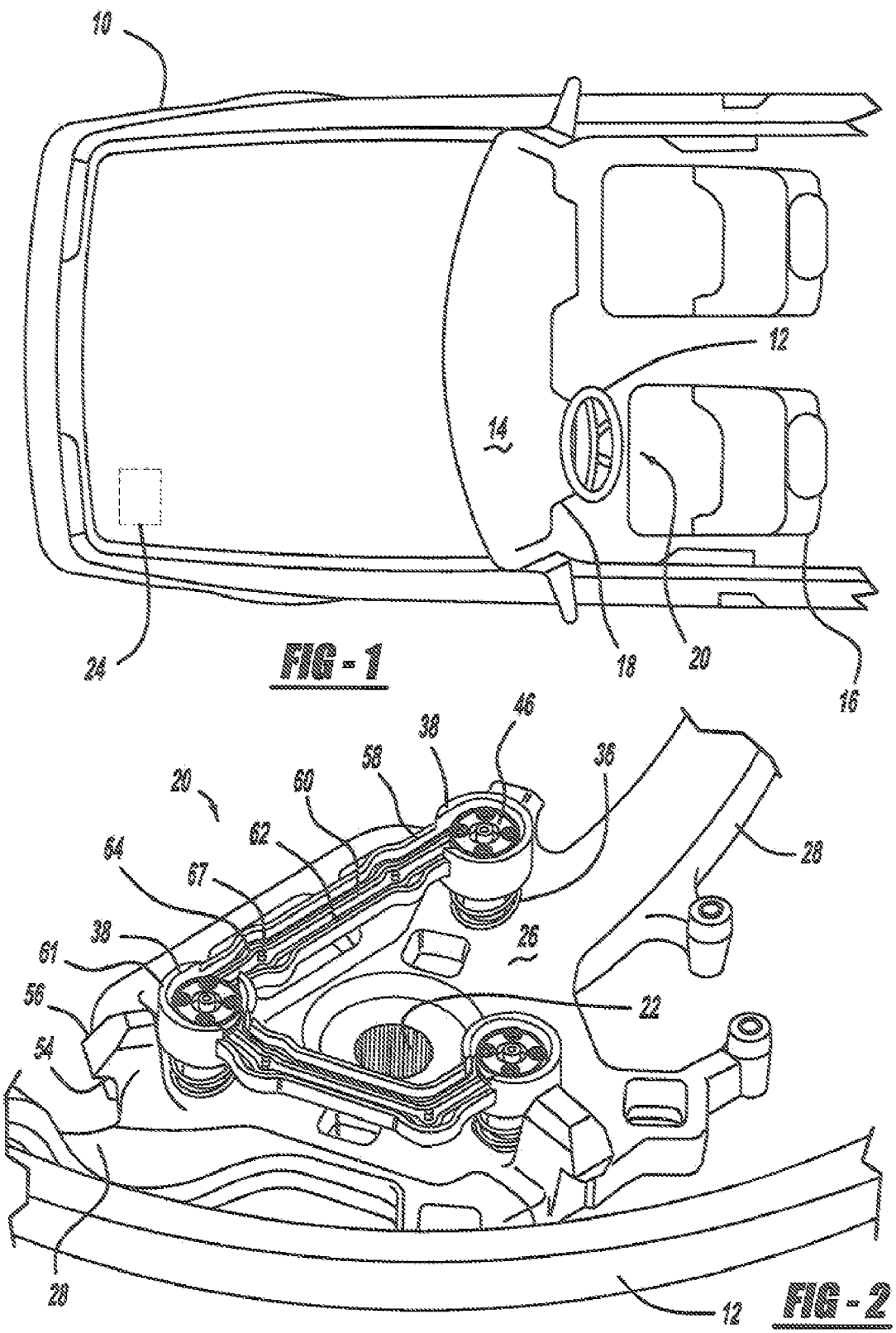

HORN ACTUATOR SWITCH

FIELD OF THE INVENTION

The present invention relates to a horn actuator switch. More specifically, the invention relates to a horn actuator switch used in conjunction with a vehicle steering wheel.

BACKGROUND OF THE INVENTION

Modern vehicles are generally equipped with horn activation system employing a horn that is activated when an operator presses on a steering wheel center portion that interfaces with a horn actuator switch. While such vehicle horns, steering wheel center portions, and horn actuator switches have generally proven satisfactory for their purposes, each is associated with its share of limitations. One such limitation of current vehicle horn activation systems is that springs intended to return a steering wheel center portion to its at rest position do not function in conjunction with a horn actuation switch; they are separate. Another limitation of current vehicle horns and associated switching is that portions of a driver airbag do not act directly on the horn switch to activate the horn switch.

What is needed then is a device that does not suffer from the above limitations. This, in turn, will provide a device that permits a horn actuation switch to operate in conjunction with return springs and that permits the horn actuation switch to operate in cooperation with an air bag positioned over such actuation switch.

SUMMARY OF THE INVENTION

A horn actuator switch for a vehicle horn has a steering wheel hub into which switch support posts are secured. Each support post may have a switch cup that houses an electrical switch used to pass electricity to sound a vehicle horn. The switch cups are biased away from the steering wheel hub with springs such that an end of the switch cup farthest from the steering wheel rises above the level of the switch. The horn switch is activated and sounds a vehicle horn when an air bag plate contacts the switch cup thereby biasing the spring to ultimately cause the air bag plate to contact and activate the horn switch. The support posts are connected together by a connecting portion.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein;

FIG. 1 is a top view of a vehicle depicting the location of a steering wheel;

FIG. 2 is a perspective view of a steering wheel depicting a horn switch and surrounding structure according to an embodiment of the present invention;

DETAILED DESCRIPTION OF THE PREFERRED EMBODIMENTS

Figure 3:
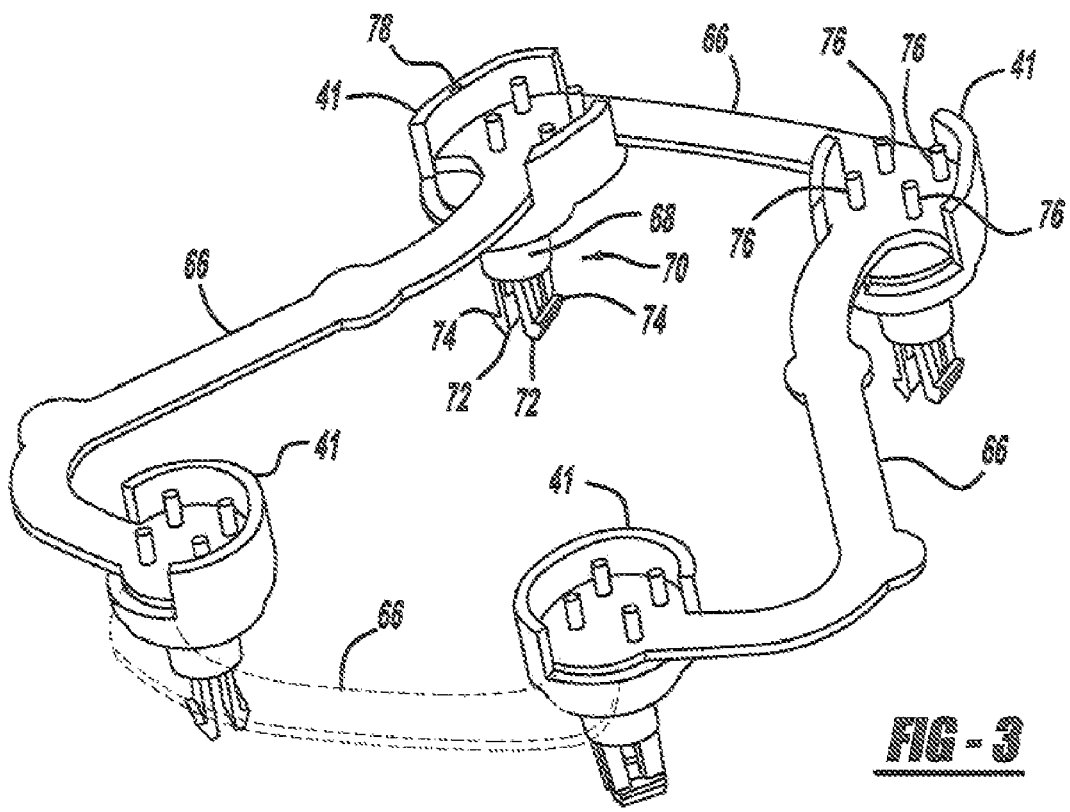
FIG. 3 is a perspective view of a steering wheel horn switch structure in partial assembly according to an embodiment of the present invention.

The following description of the preferred embodiments is merely exemplary in nature and is in no way intended to limit the invention, its application, or uses. It should be understood that throughout the drawings, corresponding reference numerals indicate like or corresponding parts and features.

Beginning with FIG. 1, a vehicle 10, such as an automobile, has a circular-shaped steering wheel 12 that is depicted positioned behind a dash 14 but in front of a driver seat 16. Generally, the steering wheel 12 protrudes from the dash by its connection to a steering column 18. Within the circular boundary of the steering wheel 12 lies a horn structure 20.

Turning to FIG. 2, the horn structure 20 generally mounts around a center mounting hole 22 upon a base structure 26, which is also part of the horn structure 20. The mounting hole 22 may be splined to fit over a corresponding splined shaft (not shown). The horn structure 20 has a variety of parts that function to sound a vehicle horn 24, which is depicted in FIG. 1. Continuing with FIG. 2, the horn structure 20 has a base structure 26, which acts as a hub or webbing of sorts for the balance of the horn structure 20 to mount to, and provides connection and rigidity to the circular wheel structure of the steering wheel 12. The base structure 26 mounts to the steering wheel with posts 28 or spokes.

Figure 5:
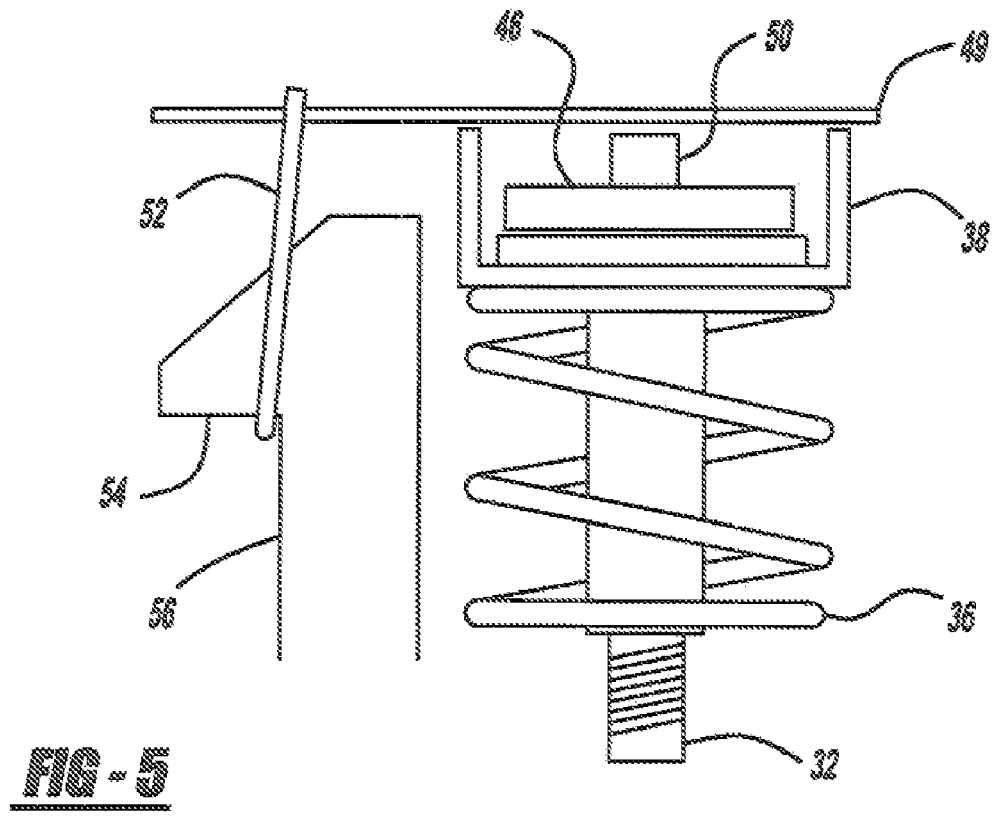
FIG. 5 is a side view of a horn actuator switch according to an embodiment of the present invention.
Figure 7:
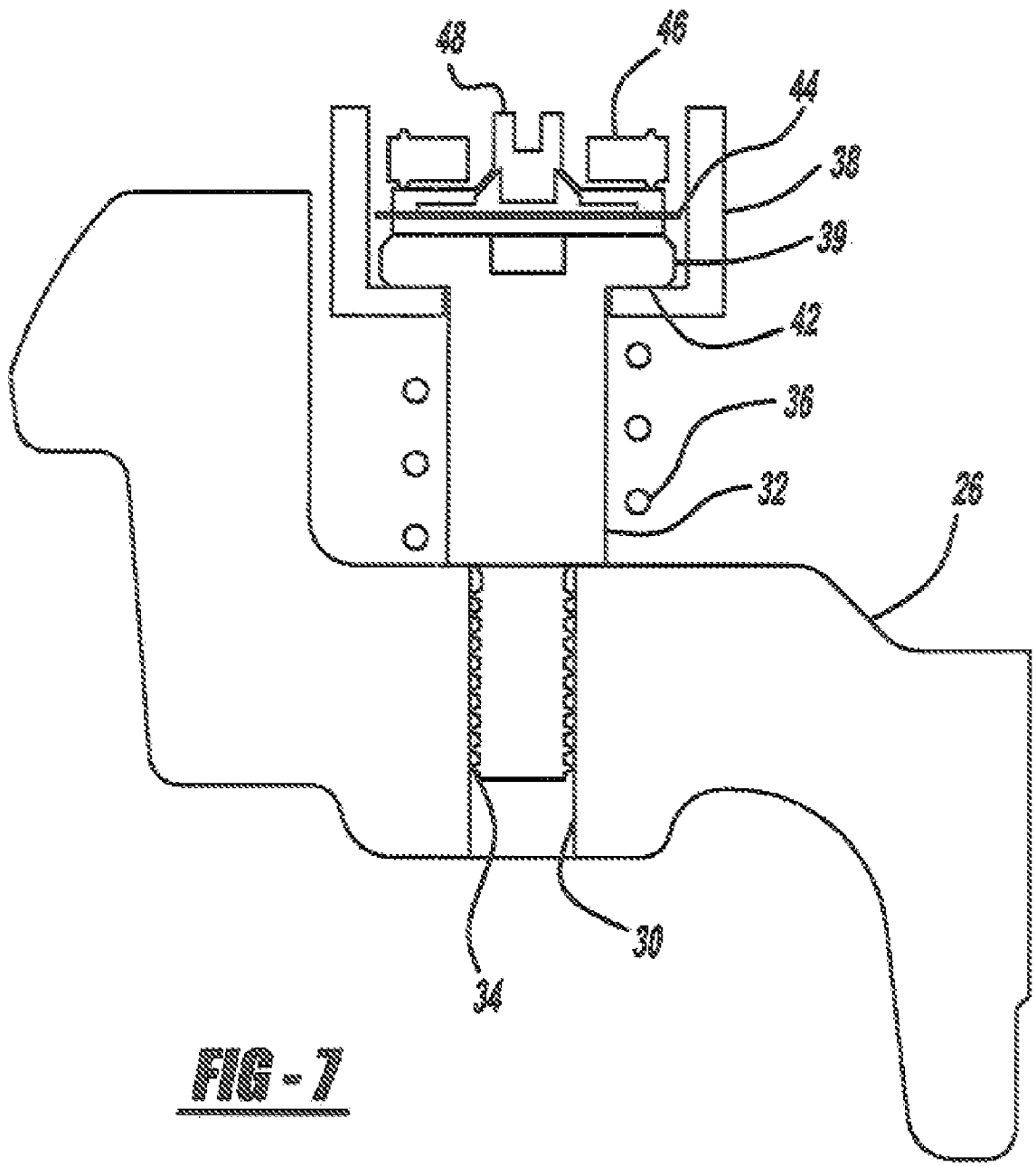
FIG. 7 is a side view of a horn actuator switch post mounted to a steering wheel according to an embodiment of the present invention.

The base structure 26 may have multiple holes 30 (FIG. 7) within it to accommodate a bolt 32, such as a shoulder bolt, which may have threads 34 to secure the bolt 32 within the hole 30. The bolt 32 or post is just one example of a fastener that may be used to secure the horn structure 20, as will be discussed later. Between the base 26 and the switch cup 38, such as around the bolt 32, a spring 36 is used to bias the switch cup 38 against a bottom portion 42 of the bolt head 39. On top of the bolt head 39 lies a printed circuit board 44 upon which an electrical switch 46 rests. The contact portion 48 is also part of the electrical switch 46 and it is the contact portion 48 that makes contact with an air bag plate 49 (FIG. 5). While a particular type of contact switch 46 is depicted in FIG. 7, it should be understood, that a variety of switch types may be used within the cup 38 of the horn structure 20.

Continuing with FIG. 5, activation of the switch 46 occurs when a vehicle operator presses on the steering wheel center portion at an air bag (not shown) location. The air bag is typically situated on the air bag plate 49 over the switch 46. Upon a large enough force being applied to the air bag plate 49, the spring 36 will begin to compress causing the air bag plate 49 to close the air gap between the air bag plate 49 and the switch 46 and eventually contact the switch 46. In another example of a switch, a button 50 or portion on the switch 46 will compress and cause the switch 46 to make contact and thus supply electrical energy to the horn 24 (FIG. 1) thereby causing the vehicle horn 24 to emit an alerting noise.

Figure 6:
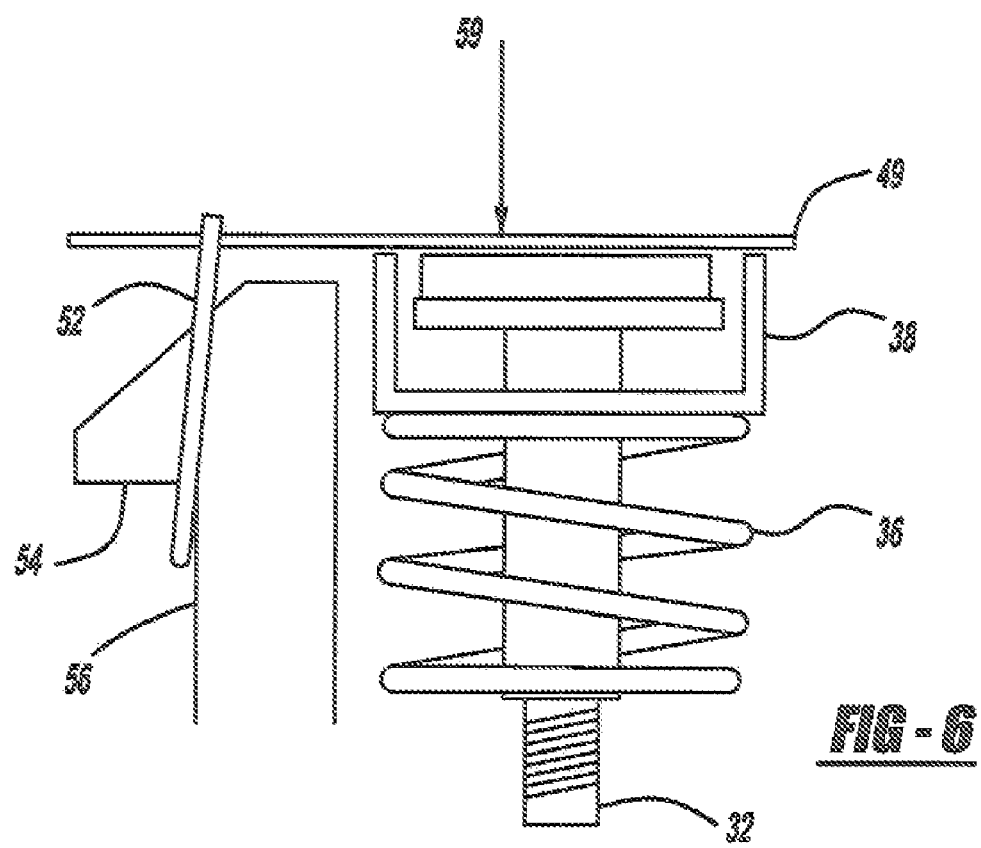
FIG. 6 is a side view of a depressed horn actuator switch according to an embodiment of the present invention.

The spring 36 is normally in a loaded or partially compressed state and thus applies a force against the cup 38. The partial compression or pre-loaded condition of the spring 36 in effect means that to further compress the spring 36 and activate the horn 24, a greater force by a person pressing on the air bag, and thus the air hag plate 49, is required than otherwise would be necessary without pre-loading. In the embodiment of FIGS. 5 and 6, to secure the spring 36 in a preloaded condition, a snap wire 52 is looped around a hook 54 on a post 56 of the base 26 such that the snap wire 52 prevents the spring 36 from expanding to its relaxed, uncompressed position.

FIG. 6 depicts a force 59 applied to the air bag plate 49 in a sufficient quantity to cause the spring 36 to further compress. As depicted, the snap wire 52 translates with the air bag plate 49 in accordance with compression of the spring 36, and depresses the button 50 or a portion of the switch to thereby cause the switch to pass electrical current to the horn 24 and sound the horn 24. Upon removal of the force 59, the spring 36 expands, forcing the air bag plate 49 from the button 50, thereby deactivating the switch 46 and stopping the sounding of the horn 24.

Further explanation of the horn structure 20 will now be described with reference to FIG. 2. FIG. 2 depicts switches 46 within cups 38 above each of the springs 36. FIG. 2 further depicts the structural and electrical configurations between such switches 46. Continuing, between adjacent cups 38, a connector channel structure 58 or bridge structure exists to provide support for electrical leads 60, 62, which may be part of a printed circuit board ("PCB") 64. As depicted in FIG. 2, the PCB 64 has holes through which small posts 67 or pegs may pass to locate and secure the PCB 64 to the channel 58. The leads 60, 62 are electrical leads and carry electrical current to and between the switches 46 within each cup 38 and ultimately transmit electrical energy to the horn 24. In the embodiment of FIG. 2, the channel 58 and cup 38 are a single structure and translate together when a force is applied to a cup 38 via the air bag plate 49. The channel structure 58 provides strength around the PCB 64 and prevents torsion or twisting between cups 38 when a single cup 38 is depressed more than the others by the air bag plate 49.

The channel 58 is a three-sided structure that provides sufficient strength to the structure when the air bag plate 49 (FIG. 5) contacts a top surface 61 of the cup 38. Since each cup 38 is supported by a spring 36, when a force is applied to or near one of the cups 38, the channel 58 will not buckle or twist under such force and may permit the applied force to depress more than one spring 36 as force is transferred by the channel 58. Thus, the channel 58, acting as a connector portion, provides structural rigidity between the cups 38 and prevents any bending or twisting in the cup 38 that might otherwise occur without its connective presence.

Figure 4:
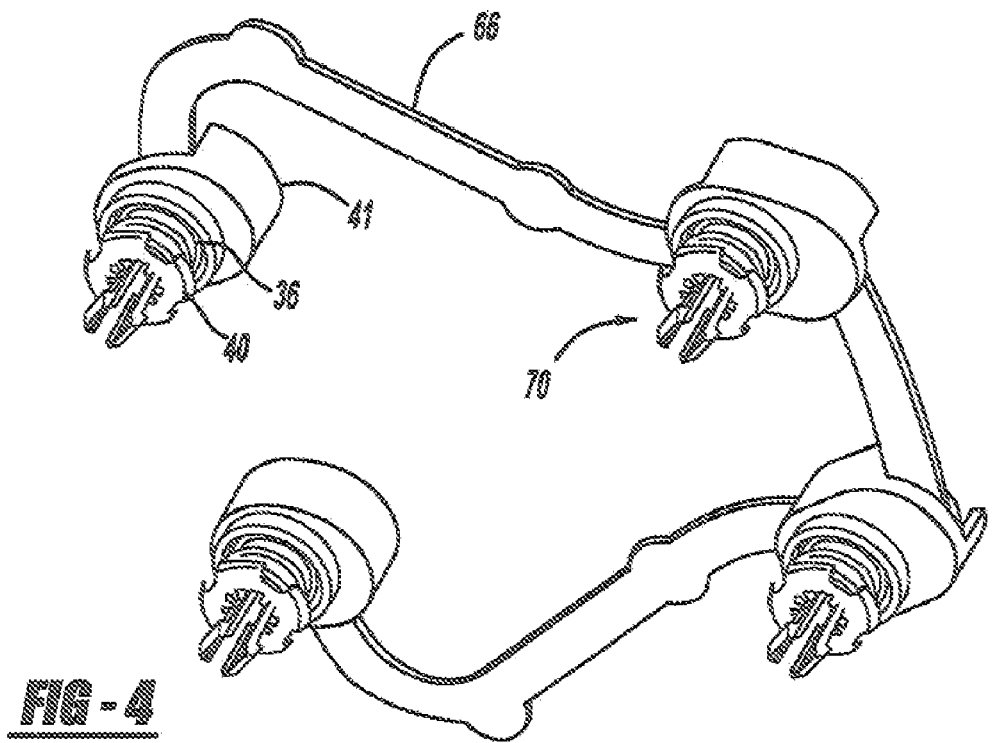
FIG. 4 is a perspective bottom view of the steering wheel horn switch structure of FIG. 3.

Although the channel 58 of FIG. 2 is described and depicted as a three-sided structure, the channel 58 may be formed into a different shape as space and packaging permits. For instance, with reference primarily to FIGS. 3-4, another embodiment of the horn structure 20 will be explained. FIG. 3 depicts cups 38 that are separate pieces from their adjoining connective structures 66. In the embodiments of FIGS. 3 and 4, when a force 59 (FIG. 5) on the air bag plate 49 causes the movement of the cup 41 and biasing of the spring 36 (FIGS. 4 and 5), the connective portion 66 does not move because the connective portion 66 and post 68 are manufactured from one piece of material. Continuing, a spring 36 is mounted below the cup 41 in a spring holder 40. The post 68 depicted in FIGS. 3 and 4 has an integrally molded expandable clip 70 for insertion into the base 26. Protruding from the post 68, the clip 70 has dual tines 72, each containing a hook portion 74. The clips 70 press into the base structure 26, under the springs 36, as depicted in FIG. 2. Upon pressing into the hole in the base structure 26, the flexible, compressed tines expand to their rest position so that the hook portion 74 secures the clip 70 in the base structure 26.

Continuing with FIG. 3, protruding from the fop portion of the post 68 are switch posts 76, which provide a locating feature for the switch 46. As depicted in FIG. 2, the holes in the switch 46 align with the switch posts 76. Although the switch posts 76 are depicted in FIG. 3 as a method of mounting a switch 46, other methods are conceivable. The connecting structure 66 of FIGS. 3 and 4 differs from the channel structure 58 of FIG. 2 in that the connecting structure 66 does not have side wails that form the channel of the channel structure 58 of FIG. 2.

One reason that the structure of FIG. 3 does not have side wails that form a channel is that the cups 41 of FIGS. 3 and 4 are capable of moving separately from the connecting structure 66 and thus the connecting portion 66 experiences different forces than the embodiment of FIG. 2. More specifically, and to illustrate use of the structure of FIGS. 3 and 4, during activation of the horn 24, the air bag plate 49 (FIG. 5) contacts a top surface 78 of a cup 41, thereby forcing the cup 41 along the length of the post 68, thereby compressing the spring 36 under the cup 41. While the cup 41 is moving along the length of the post 68, the gap between the air bag plate 49 and the switch 46 closes before the air bag plate 49 contacts the switch 46 (FIG. 2). Because the cups 41 are independent of the connecting structure 66, the cups 41 slide along the posts 68 more freely and independently than if the cups 41 were part of the connecting structure 66; thus, there is reduced force placed on the connective structure 66 than in the embodiment of FIG. 2.

Although the cups 41 slide along the posts 68 during operation, the connective structure 66 of FIG. 3 will still experience forces during switch operation, as described above. For example, since each cup 41 has close tolerances with its respective adjoining post 68 and although each cup 41 will slide along its respective post 68 when contacted, limited canting of each cup 41 on its post 68 is possible, and thus may place a force on the connective structure 66. However, an advantage of the connective structure 66 is that because it connects posts 68, forces on one post 68 may be shared with all posts 68. Although optional, the connective portion 66 shown in phantom in FIG. 3 may also be used to increase overall connective strength of the horn structure 20. Furthermore, by linking the cups 38, 41 with a connecting structure 66 that adds rigidity to the overall horn switch structure, any canting potential of an individual, free-standing cup is reduced or eliminated. This arrangement provides reliable horn switch actuation because the cup 38, 41 is maintained in close tolerances to its corresponding post 68. Regarding wiring of the switches, as depicted in FIG. 2, a PCB 64 and flat leads 60, 62 may be used in the embodiment depicted in FIGS. 3 and 4; however, instead of a PCB 64 and flat leads, round wires may be used. Such wires would be configured similarly to that depicted in FIG. 2.

The embodiment of FIGS. 5-7 depicts a more traditional threaded bolt 32 of metal or plastic that screws into an aluminum or metallic base 26; however, the molded plastic, expandable insert clips 70 of FIGS. 2-4 may be used, and will be explained later. Such clips 70 provide advantages related to part cost, part weight, and assembly time and simplicity.

Figure 8:
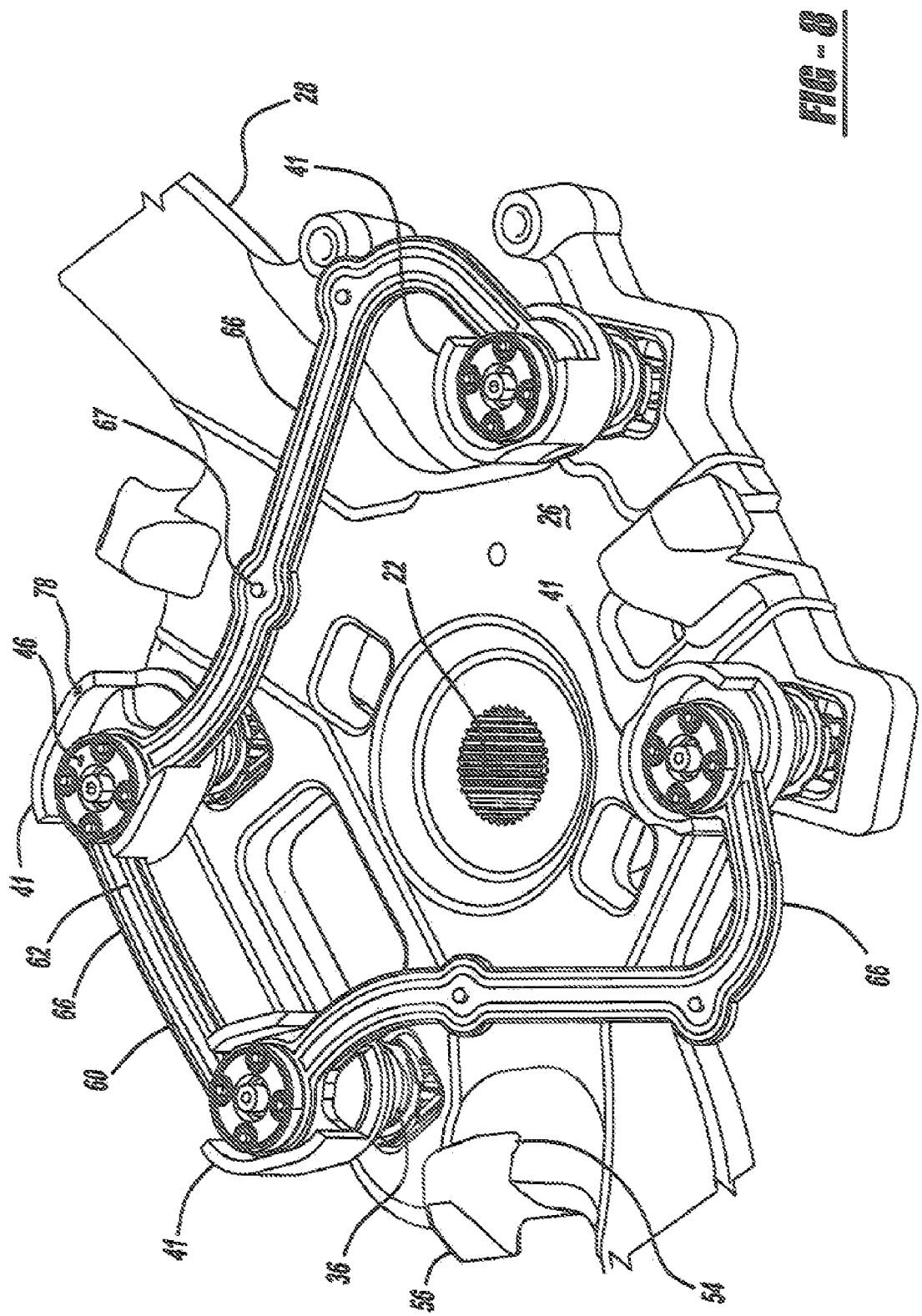
FIG. 8 is a perspective view of a steering wheel horn actuator depicting horn switches and surrounding structure according to an embodiment of the present invention.

FIG. 8 is a perspective view of a steering wheel 12 depicting a horn structure 20 according to an embodiment of the present invention. More specifically, the horn structure of FIG. 8 depicts further development of the embodiment of FIGS. 3 and 4 by depicting a switch 46 within a cup 41 and associated wiring between cups 41, such as electrical leads 60, 62 which relay electricity to the vehicle horn 24. The embodiment of FIG. 8 is also similar to that of FIG. 2, but with some differences. The embodiment of FIG. 8 relies on a connective structure 66 that is separate from the cups 41 as is also depicted in FIGS. 3 and 4. The electrical leads 60, 62 may be mounted to a common structure, such as a thin film or PCB 66 that presses over the small post 67 to securely hold the leads 60, 62 in place and that also permits the leads 60, 62 to move with the connective structure 66. Although the leads 60, 62 move with the connective structure 66, they move independently of the cups 41 so that the switches 46 may be activated to sound the horn 24 upon depression of a single cup 41 or multiple cups 41.

Figure 9:
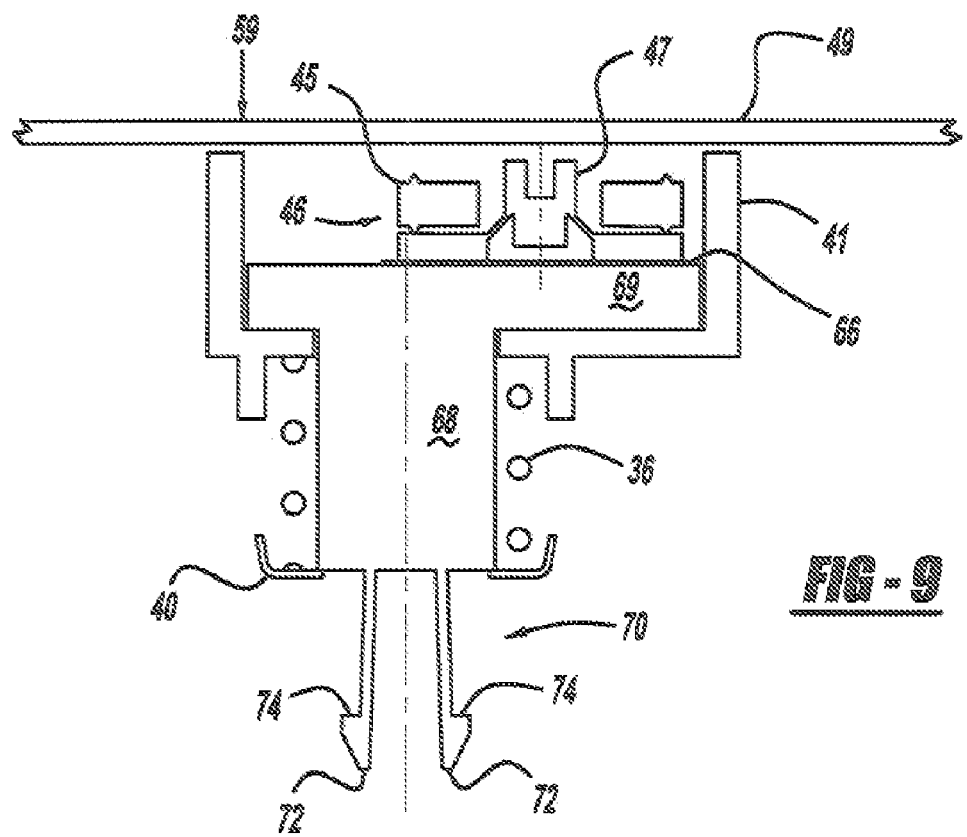
FIG. 9 is a cross-sectional view of a non-depressed offset horn actuator switch according to an embodiment of the present invention.

Turning now to FIG. 9, a cross-sectional view of a non-depressed offset horn actuator cup 41 and associated structure is depicted. More specifically, FIG. 9 depicts an offset style cup 41 containing a post 68 with an extended, supportive horizontal structure 69. The switch 46 may be mounted to the post 68 and horizontal structure 69 with switch post 76 as depicted in FIG. 3. The switch has a top portion 45 and a bottom portion 47, which also has a post that protrudes through the top portion 45. Operation of the switch occurs when an outside force, depicted by arrow 59, contacts a structure adjacent to the post of switch bottom portion 47. The air bag plate 49 is an example of a structure that may contact the post of the switch bottom portion 47. The plate 49 contacts the post of the switch bottom portion 47 upon compression of the spring 36 by the cup 41, which rests upon the spring 36. The spring 36 is supported by and biases against a spring holder 40 at the bottom of the post 68.

At an opposite end of the post 68 from the switch 46 lies a clip 70, as mentioned in conjunction with FIGS. 3 and 4. The press-in clip 70 securely fastens to the base structure 26 of the steering wheel 12. As depicted in FIGS. 3-4 and 9-10, the dip 70 exhibits flexible tines 72 with a hook portion 74 to lock the clip 70, post 68 and its connective structure in holes of the base structure 26 of the steering wheel 12. Such locking of the tines 72 secures the entire horn structure 20 to the steering wheel 12.

Figure 10:
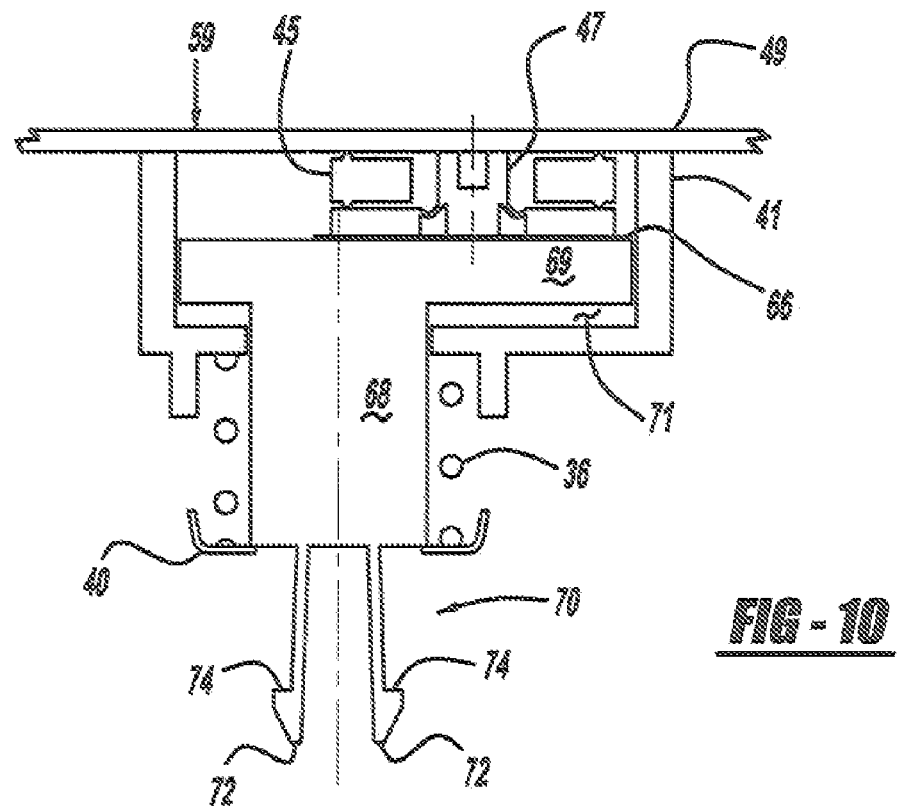
FIG. 10 is a cross-sectional view of a depressed offset horn actuator switch according to an embodiment of the present invention.

FIG. 10 depicts the offset switch in a depressed mode that activates the switch 46. In the switch's activated position, the switch top portion 45 contacts the plate 49 when the force depicted by arrow 59 causes the plate 49 to contact the post of the switch bottom portion 47. As depicted in FIG. 10, with the cup 41 depressed, a gap 71 forms between the flange or elongated horizontal structure 69 and the cup 41. The spring 36 compresses in consideration of the force 59 and then returns the cup 41 to its position against the flange or horizontal structure 69 of the post 68 upon relinquishment of the force 59.

Figure 11:
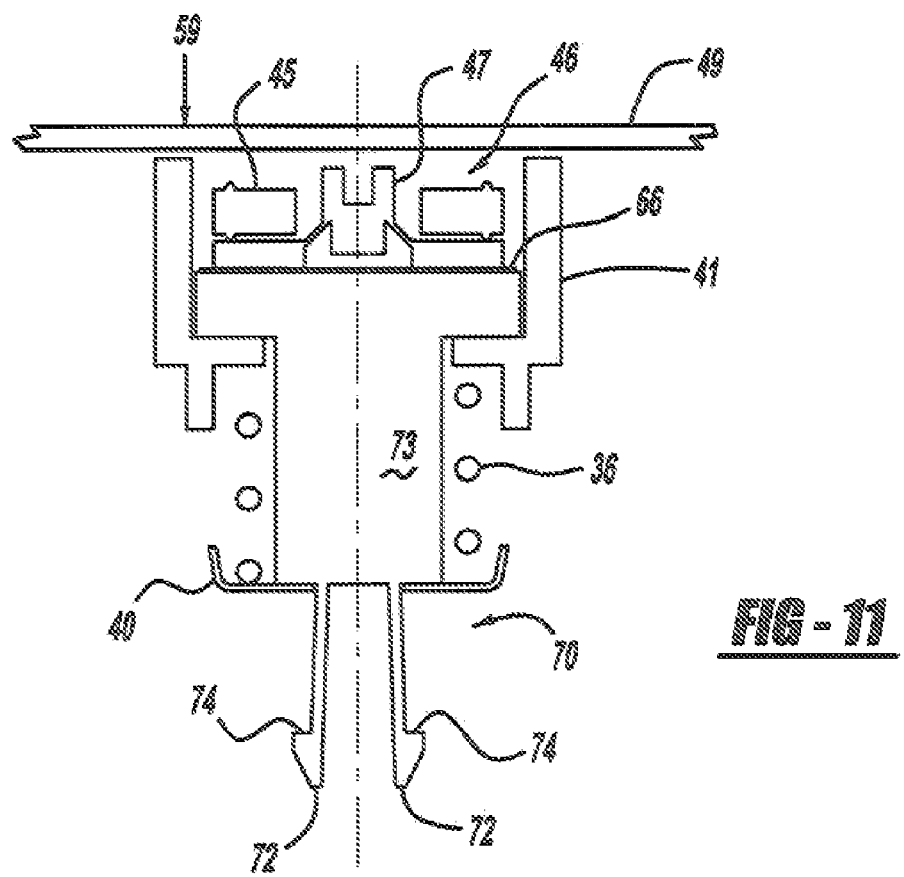
FIG. 11 is a cross-sectional view of a non-depressed symmetrical horn actuator switch according to an embodiment of the present invention.
Figure 12:
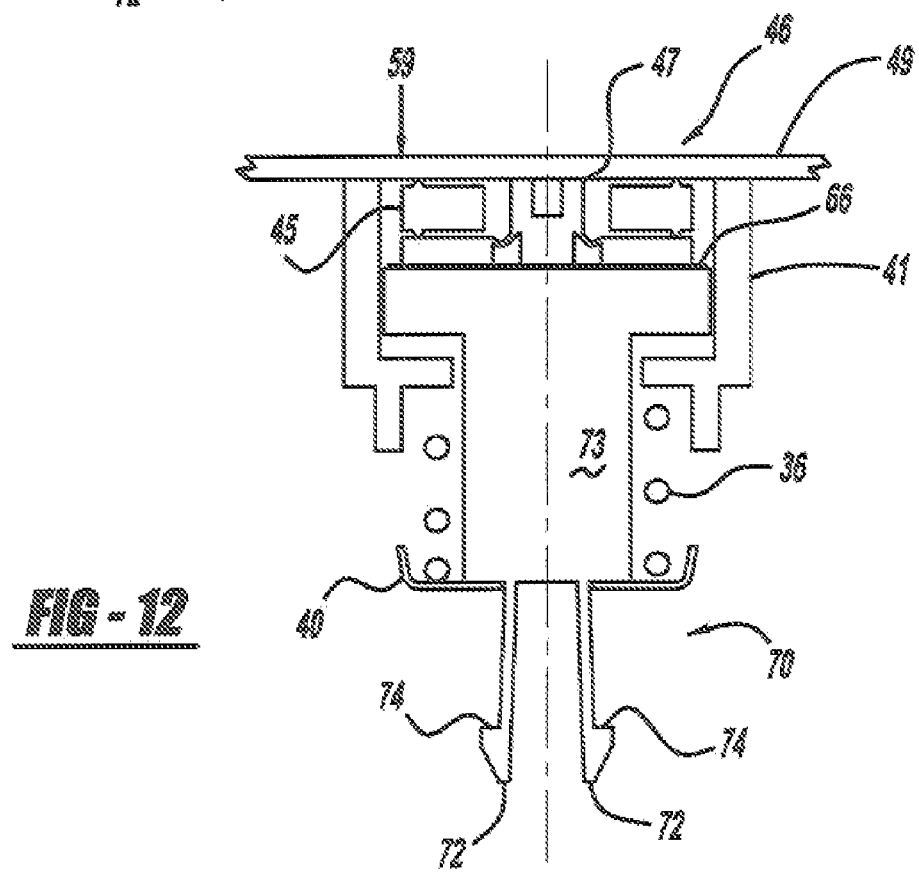
FIG. 12 is a cross-sectional view of a depressed symmetrical horn actuator switch according to an embodiment of the present invention.

FIGS. 11 and 12 depict cross-sectional views of a horn actuator switch 46 and cup 41 similar to the embodiment of FIGS. 9 and 10; however, the post 73 of the structures of FIGS. 11 and 12 are symmetrical. Because the post 73 is symmetrical, it does not depict the horizontal structure 69 as depicted in FIGS. 9 and 10; however, the symmetrical embodiments function primarily the same as their non-symmetrical counterparts. The non-symmetrical or offset embodiments of FIGS. 9-10 provide a larger area over which the plate 49 may contact, as compared to the symmetrical structures of FIGS. 11-12.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A horn actuator for a vehicle horn, comprising:
   a steering wheel hub;
   a first support post secured into the steering wheel hub;
   a first cup situated at an upper portion of the first support post;
   a first spring around the first support post to bias the first cup away from the steering wheel hub; and
   a first switch within the first cup, the first switch for activating the horn.

2. The horn actuator of claim 1, further comprising:
   a plate at an end of the first cup to bias the cup toward the steering wheel hub and activate the first switch.

3. The horn actuator of claim 1, wherein the first cup is slidable along the first support post.

4. The horn actuator of claim 1, further comprising:
   a second support post secured into the steering wheel hub;
   a second cup situated at an upper portion of the second support post;
   a second spring around the second support post to bias the second cup away from the steering wheel hub; and
   a second switch positioned within the second cup, the second switch for activating the horn.

5. The horn actuator of claim 4, further comprising:
   a first connective portion connecting the first support post and the second support post.

6. The horn actuator of claim 5, wherein the first connective portion is a channel structure.

7. The horn actuator of claim 5, wherein the first connective portion is flat.

8. The horn actuator of claim 5, wherein the first connective portion lies between ends of the first cup and the second cup.

9. A horn actuator for a vehicle horn, comprising:
   a steering wheel;
   a first support post secured into the steering wheel;
   a first cup at an upper portion of the first support post;
   a first spring between the steering wheel and the first cup to bias the first cup away from the steering wheel hub;
   a first switch within the first cup;
   a second support post secured into the steering wheel;
   a second cup at an upper portion of the second support post;
   a second spring between the steering wheel hub and the second cup to bias the second cup away from the steering wheel;
   a second switch within the second cup; and
   a first connective portion connecting the first support post and the second support post.

10. The horn actuator of claim 9, further comprising:
    an air bag plate at an end of the first and second cups to move the cups toward the steering wheel hub.

11. The horn actuator of claim 9, further comprising:
    a first connective portion connecting the first support post and the second support post.

12. The horn actuator of claim 11, further comprising:
    at least one electrical wire connecting the first and second switches.

13. The horn actuator of claim 12, wherein the at least one electrical wire mounts to the first connective portion.

14. The horn actuator of claim 11, wherein the first support post further comprises flexible locking tines.

15. The horn actuator of claim 12, further comprising:
a third support post secured into the steering wheel;
a third cup at an upper portion of the first support post;
a third spring between the steering wheel and the third cup to bias the third cup away from the steering wheel; and
a third switch positioned within the third cup.

16. The horn actuator of claim 15, further comprising:
a second connective portion connecting the third support post and the second support post.

17. The horn actuator of claim 16, wherein the first and second connective portions are channels.

18. The horn actuator of claim 15, wherein the first, second, and third cups are slidable on the first, second, and third support posts, respectively.

19. A horn actuator for a vehicle horn, comprising:
a steering wheel hub;
a first support post secured into the steering wheel hub;
a first cup slidable upon the first support post;
a first spring positioned between the steering wheel hub and the first cup to bias the first cup away from the steering wheel hub;
a first switch positioned within the first cup; and
a second support post secured into the steering wheel hub;
a second cup slidable upon the second support post;
a second spring positioned between the steering wheel hub and the first cup to bias the first cup away from the steering wheel hub;
a second switch positioned within the second cup;
a plate that contacts an end of the first and second cups to move the cups toward the steering wheel hub to activate the first switch; and
a first connective portion connecting the first support post and the second support post.

20. The horn actuator of claim 19, wherein the first connective portion lies between the ends of the first and second cups.

* * * * *